United States Patent [19]

Maher

[11] Patent Number: 4,533,974
[45] Date of Patent: Aug. 6, 1985

[54] LOW-FIRING HIGH Q MONOLITHIC CERAMIC CAPACITOR

[75] Inventor: Galeb H. Maher, North Adams, Mass.

[73] Assignee: Sprague Electric Company, North Adams, Mass.

[21] Appl. No.: 597,907

[22] Filed: Apr. 9, 1984

[51] Int. Cl.³ .............................................. H01G 4/12
[52] U.S. Cl. .................................... 361/320; 501/136
[58] Field of Search ..................... 361/320, 321, 322; 501/135, 136, 137

[56] References Cited

U.S. PATENT DOCUMENTS 4,101,952  7/1978  Burn ............................... 361/320 X
4,308,570  12/1981 Burn .................................. 361/320

*Primary Examiner*—L. T. Hix
*Assistant Examiner*—Douglas S. Lee

[57] ABSTRACT

Monolithic ceramic capacitors exhibiting Q values of around 10,000 at 10 MHz have been made that sinter at 1100° C. The buried electrodes are a 70 Ag/30 Pd alloy. The body has a high firing component and a low melting borate flux. The high firing component is a magnesium zinc titanate. The TCC of these capacitors is at least as low as 0±60 ppm.

8 Claims, 2 Drawing Figures

LOW-FIRING HIGH Q MONOLITHIC CERAMIC CAPACITOR

BACKGROUND OF THE INVENTION

This invention relates to monolithic ceramic capacitors having high Q values and near zero temperature coefficients of capacity and more particularly to a low temperature firing magnesium-titanate based ceramic suitable for use with low cost low melting alloy buried electrodes.

Magnesium-titanate has been used as a capacitor dielectric providing a low dielectric constant (K), a low temperature coefficient of capacity (TCC) and a high quality factor (Q). The Q of a capacitor is defined as the ratio of capacitive reactance to equivalent series resistance at the frequency of measurement. The dissipation factor DF is the reciprocal of the Q. It is also known to combine a nonreducible magnesium titanate with a nonreducible alkaline earth borate to form a body of a monolithic ceramic capacitor with co-fired copper electrodes, as is taught by Burn in U.S. Pat. No. 4,308,570 issued Dec. 29, 1981, and assigned to the same assignee as is the present invention. Those capacitors are fired in a partial oxygen atmosphere of $10^{-11}$ $O_2$ atmospheres at 1050° C. to avoid melting the copper and oxidizing the copper. The nonreducible glass-ceramic is capable of keeping its oxygen at such a firing and therefore does not become semiconducting at all which would typically first show up as a degradation in the Q of the capacitor.

However, even though the Q of such low cost capacitors is quite high, around 3500 at 1 MHz, there are some applications for which much higher capacitor Q's are required.

It is therefore an object of the present invention to provide a monolithic ceramic capacitor having a quality factor Q of at least 5000 at 1 MHz.

It is a further object of this invention to provide such a capacitor having a TCC of less than about 60 ppm/°C. from −55° C. to +125° C.

It is yet a further object of this invention to provide such a capacitor having an air firable construction using a magnesium-zinc titanate and an optimum but low amount of glass for the dielectric body.

SUMMARY OF THE INVENTION

A monolithic ceramic capacitor contains one or more low melting buried electrodes having been co-fired with the capacitor body. The body is comprised of from 92 to 98 weight percent of a high firing crystalline composition and from 8 to 2 weight percent of a low firing borate flux to achieve a low body sintering temperature. Thus a firing temperature below that of the buried electrode is possible. The high firing composition is comprised of from 90 to 95 weight percent of a magnesium zinc titanate and from 10 to 5 percent of calcium titanate.

The magnesium zinc titanate has the formula

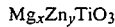

$Mg_xZn_yTiO_3$ preferably chosen from the compositions wherein x ranges from 0.5 to 0.85 and y ranges from 0.2 and 0.4. More particularly, the composition wherein x is 0.67 and y is 0.33 advantageously provides a single phase magnesium zinc titanate that is easily identified by x-ray spectroscopy or electronmicroprobe and is simpler and easier to control in production.

DESCRIPTION OF THE PREFERRED EMBODIMENTS

Figure 1:
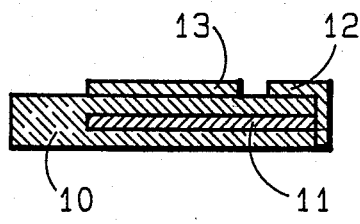
FIG. 1 shows in cross sectional view a monolithic capacitor of this invention having a reduction resistant glass-ceramic body 10, one electrode 11 buried therein, an external conductive terminal 12 by which external contact is made to the electrode 11, and another electrode 13 in contact with body 10 and in capacitive relationship with buried electrode 11.
Figure 2:
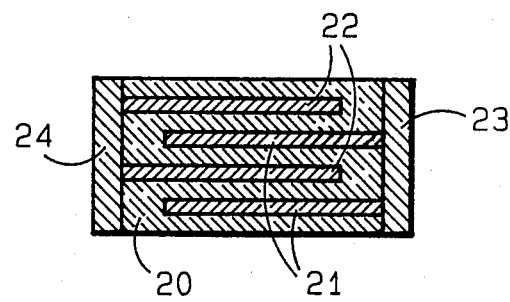
FIG. 2 shows in cross sectional view a monolithic capacitor of this invention having a glass-ceramic body 20, a group of electrodes 21 being buried therein and being in capacitive relationship with another group of buried electrodes 22. External terminals 23 and 24 are connected to the group 21 and group 22 electrodes respectively.

In the first preferred embodiment of this invention a monolithic ceramic capacitor as in FIGS. 1 and 2 has buried electrodes of a 70Ag30Pd alloy, proportions given by weight. This alloy has a melting temperature of about 1150° C. The body of this capacitor is made up of 96 weight percent of a high firing crystalline portion comprised of 93.4 ($Mg_{\frac{2}{3}}Zn_{\frac{1}{3}}TiO_3$) 6.6 ($CaTiO_3$), proportions given by weight, and 4 weight percent of a glassy flux phase, namely $CdO:2ZnO:B_2O_3$ wherein the colon indicates molar proportions of the oxides.

A number of experimental capacitors of this type, similar in structure to the multiple buried layer capacitor of FIG. 2, were made. Some have a nominal capacitance of 30 pf and others have larger bodies with a nominal capacitance of 300 pf. These capacitors have a Q at 1 MHz of from 9000 to 11000. The TCC at −55° C. is positive, namely P±5 ppm/°C. and at +125° C. is P30±5 ppm/°C. The dielectric constant is about 20. These data appear in Table 1 as Example 28.

The above-identified experimental capacitors were made by first ball milling for an hour electronic grade powders of $MgCO_3$, ZnO and $TiO_2$ in proportions to produce the ceramic compound $Mg_{\frac{2}{3}}Zn_{\frac{1}{3}}TiO_3$ plus CaO and $TiO_2$ in amounts and proportions to contribute the above noted 6.6 weight percent $CaTiO_3$. The milled powders were then dried, granulated and calcined at between 1150° and 1200° C. This was followed by jet pulverizing to an average particle size of about 1.5 microns. The resulting powder was then mixed with powders of the constituent oxides of the flux.

The powder mixture was combined with an organic flux vehicle and binder mixture in a ball mill and milled again for 6 hours. A slurry was made of the milled material that was formed into thin layers and dried. An electroding ink containing the silver and palladium was screen printed on some of the layers. Stacks were formed of the printed layers and at least one unprinted layer was laid over the printed electrode at the top of the stack. The stacks were diced into chips and the chips were heated to 800° C. to eliminate remaining organic materials. The chips were fired for 2½ hours at 1100° C. in a closed crucible producing fully mature dense non porous bodies and simultaneously sintering both the electrode films and the body.

In a second preferred embodiment a monolithic ceramic capacitor has buried electrodes of 70Ag30Pd alloy. The body is made up of 97 weight percent of the high firing portion 93.4 ($Mg_{\frac{2}{3}}Zn_{\frac{1}{3}}TiO_3$) 6.6 ($CaTiO_3$) and 3 weight percent of a glass phase, namely $\frac{2}{3}$MgO: $\frac{1}{3}$ZnO: $B_2O_3$ (or $2MgO:ZnO:3B_2O_3$). Monolithic capacitors of this material would be expected to have a Q of greater than 10,000 and a TCC within ±30 ppm/°C. based on data that follows in Example 21.

A number of experimental wafer capacitors were made as and expedient, for determining the relative effect upon electrical parameters of changes in dielectric formulations.

Slurries of the start powders were cast on a glass plate using a doctor blade technique. When dry the cast layer was cut into squares of about 10 MM × 10 MM × 0.5 MM. The organic binder was removed by heating for 2 hours at 800° C. The squares were fired in a closed crucible at 1100° C. (unless otherwise noted) for 2½ hours. Silver electrodes were then applied to the opposite major faces of each fired square. The dielectric constant of all the experimental materials is around 20 and the capacitance values are so small for these wafers that it is not possible to make absolute measurements of the temperature coefficient of capacitance and Q (or DF) with high accuracy; but the relative differences in the wafer capacitors' performance provides a reliable indication of relative merits of the various formulations.

In Examples 1–22, for which data are shown in Table 1, the high firing portion of the dielectric is the 93.4 ($Mn_{\frac{2}{3}}Zn_{\frac{1}{3}}TiO_3$) 6.6 ($CaTiO_3$) of the above noted first preferred embodiment.

The bismuth borate of Example 9 provided a material that must be fired at least as high as 1125° C. to sinter properly but still exhibits too high a DF.

Barium borates in Examples 10,11,12,13,14 and 15 led to excessively high DF leading to the conclusion that barium should not be a principal element in the flux.

The magnesium borate of Example 18 appears to be optimum for providing lowest DF and best TCC linearity compared to the Examples 16,17,19 and 20 using other amounts.

The low flux amounts of magnesium zinc borate used in Examples 21 and 22 provide relatively low DF and in fact suggest that even lower amounts may be optimum. This material appears to be an excellent flux for meeting the objectives set further herein.

Yet another indication in the data of Table 1 of the factors that lead to optimum composition is the molar amount of boron oxide (in mole %) relative to the amount of titanium there. About 2 mole percent of the borate appears to be about optimum, depending to a minor extent upon what other elements are present in the flux. For instance the low DF values for Examples 6,18 and 21 exhibit such a correlation. From these data it is concluded that $B_2O_3$ may range from 1.0 to 3.5 mole % of the titanium.

In Example 9 there was clearly not enough boron (0.08 mole %) to fully sinter that ceramic composition and it is anticipated that a bismuth borate flux with a lower ratio of bismuth to boron will give good results.

TABLE 1

| | | 93.4($Mg_{\frac{2}{3}}Zn_{\frac{1}{3}}TiO_3$)6.6($CaTiO_3$) | | | | |
|---|---|---|---|---|---|---|
| EX. | Flux Additive | WT % | $B_2$ M % | Porosity (open) | DF @ 1 MHz (%) | TCC (ppm/°C.) |
| | | | | | | −55° C. / +125° C. |
| 1 | $5CdO:2SiO_2$ | 0.0 | | gross | — | — — |
| 2 | " | 3.0 | | slight | 0.08 | P21  P70 |
| 3 | " | 4.0 | | none | 0.08 | P74  P82 |
| 4 | $CdO:2ZnO:B_2O_3$ | 3.0 | 1.1 | none | 0.03 | N14  P6 |
| 5 | $2CdO:ZnO:B_2O_3$ | 3.0 | 1.0 | none | 0.08 | P73  P160 |
| 6 | $0.37ZnO:0.63B_2O_3$ | 2.0 | 2.2 | none | 0.04 | P28  P57 |
| 7 | " | 4.0 | 4.5 | none | 0.06 | N19  P14 |
| 8 | " | 6.0 | | none | 0.07 | N51  N13 |
| 9 | $12Bi_2O_3:B_2O_3$ | 4.0 | .08 | none *1 | 0.06 | P9  P54 |
| 10 | $BaO:4B_2O_3$ | 1.5 | 1.8 | none | 0.065 | N10  N27 |
| 11 | " | 4.0 | | none | 0.12 | N27  P10 |
| 12 | $BaO:2B_2O_3$ | 1.5 | 1.3 | none | 0.067 | N9  N14 |
| 13 | " | 4.0 | | none | 0.11 | P34  P20 |
| 14 | $BaO:B_2O_3$ | 1.5 | .91 | none | 0.36 | P183  P400 |
| 15 | " | 4.0 | | none | 0.85 | P144  P231 |
| 16 | $3MgO:B_2O_3$ | 1.0 | .70 | none | 0.75 | P190  P180 |
| 17 | " | 1.5 | 1.1 | none | 0.17 | P700  P400 |
| 18 | " | 3.0 | 2.1 | none | 0.03 | P10  P43 |
| 19 | " | 4.0 | 2.9 | none | 0.04 | P22  P38 |
| 20 | " | 5.0 | 3.8 | none | 0.10 | N6  P30 |
| 21 | $Mg_{\frac{2}{3}}Zn_{\frac{1}{3}}:B_2O_3$ | 2.0 | 2.2 | none | 0.02 | P14  P66 |
| 22 | " | 3.0 | 3.3 | none | 0.02 | P22  P55 |

Note:
*1 fired at 1125° C. to densify

In Examples 1,2 and 3, cadmium silicate flux in quantities large enough to obtain full sintering at 1100° C. leads to a high DF.

The cadmium zinc borate of Example 4 provides a much lower DF and more linear TCC than that of Example 5.

The zinc borate of Example 6 at 2 weight percent provides good sintering at 1100° C. but viewed with the higher amounts used in Examples 7 and 8 would suggest that an optimum amount for lowest DF less than 2 weight percent may be enough to provide adequate sintering.

The excellent results obtained in Example 21 wherein only 2 weight percent flux provided full sintering suggests that an even better result may result by adjusting the amount of magnesium zinc borate flux downward even further.

Major amounts of other elements in the flux are to be avoided. For instance barium (Example 10 through 15) and cadmium (Examples 1 through 5) have a degrading influence on DF. Silicon (Examples 1,2 and 3) is not as effective as boron in effecting a low temperature sintering. Boron is thus greatly preferred and there should be at least twice the molar amount of boron than of silicon.

Without any flux or additives it was found that both of the above mentioned magnesium zinc titanates sinter at 1250° C. In further tests, it was considered fortuitous that the addition of small amounts of calcium titanate not only adjusts the TCC downward, but also reduces the sintering temperature. For example a 5 wt % addition of $CaTiO_3$ will permit sintering at 1200° C.

A higher magnesium containing magnesium zinc titanate was investigated in Examples 23 through 27. This higher Mg ceramic was supplied by the TAM Ceramics Coroporation, Niagara Falls, N.Y., and designated TAM #5222. This material was the composition that is approximately $Mg_{4/5}Zn_{\frac{1}{5}}TiO_3$.

TABLE 2

| | 92.5($Mg_{4/5}Zn_{\frac{1}{5}}TiO_3$)7.5($CaTiO_3$) | | | | | |
|---|---|---|---|---|---|---|
| EX. | Flux Additive | WT % | Sintering Temp. (°C.) | DF @ 1 MHz (%) | TCC (ppm/°C.) −55 | +125° C. |
| 23 | $5CdO:2SiO_2$ | 3.0 | 1100 *1 | — | — | — |
| 24 | $CdO:2ZnO:B_2O_3$ | 3.0 | 1100 | 0.03 | P8 | P37 |
| 25 | $41.8CdO:8.2Bi_2O_3$: $17PbO:7.5ZnO:11B_2O_3$: $13SiO_2:1.5Al_2O_3$ | 5.0 | 1100 *2 | 0.16 | P200 | P300 |

Notes:
*1 Not fully densified
*2 No calcium titanate added

In Table 2, the magnesium-rich $Mg_{4/5}Zn_{\frac{1}{5}}TiO_3$ is combined with 7.5 Wt % $CaTiO_3$ and then with one of three fluxes to bring the sintering temperatures down to 1100° C., a safe sintering temperature for use with 70Ag30Pd buried electrodes that have a solidus of 1150° C. In Example 23, cadmium silicate at 3 wt % is not enough to effect sintering. A zinc rich cadmium zinc borate in Example 24 at 3 wt % gives good sintering and a fairly low DF. These are the same fluxes used in Example 1 and 4, respectively and give comparable results. The more complex flux of Example 25 even at 5 wt % is not quite enough to fully sinter the ceramic, which fact is reflected in the high DF and high TCC.

Examples 1 through 25 relate to wafer capacitors. In table 3, data from four groups of monolithic ceramic capacitors having 70Ag/30Pd electrodes is provided. Here in Examples 25 and 27, the fluxes of Examples 23 and 24, respectively, were used, the larger 4 wt % cadmium silicate effects sintering but still exhibits too high a Q for a monolithic ceramic composition. The cadmium zinc borate of example 27 exhibits excellent properties. Note that the DF for this monolithic is lower than for the wafer, a phenomenon noted above that is related to the difficulty of making such measurements on very small value wafer capacitors.

TABLE 3

| EX. | Flux Additive | WT % | Sintering Temp. (°C.) | DF @ 1 MHz (%) | TCC (ppm/°C.) −55° C. | +125° C. |
|---|---|---|---|---|---|---|
| | 93.75($Mg_{4/5}Zn_{\frac{1}{5}}TiO_3$)6.25($CaTiO_3$) | | | | | |
| 26 | $5CdO:2SiO_2$ | 4.0 | 1100 | 0.035 | P40 | P500 |
| 27 | $CdO:2ZnO:B_2O_3$ | 4.0 | 1100 | 0.01 | P25 | P53 |
| | 93.4($Mg_{\frac{4}{5}}Zn_{\frac{1}{5}}TiO_3$)6.6($CaTiO_3$) | | | | | |
| 28 | $CdO:2ZnO:B_2O_3$ | 4.0 | 1100 | 0.01 | P5 | P30 |
| 29 | $2MgO:B_2O_3$ | 4.0 | 1100 | 0.02 | P7 | P50 |

In Example 28, the flux of Example 4 is used with the same comparative result. The magnesium borate in the monolithic capacitor of Example 29 also gives excellent results. In the last three of these monolithic capacitors, the addition of a little more $CaTiO_3$ is indicated to bring the TCC nearer to zero. About 6.8 wt % is expected to be near optimum.

Calcium titanate has a low solubility in magnesium zinc titanate and exists as a second phase in the body.

In order to get a measure of the leakage resistance of capacitors having the dielectric material of the first preferred embodiment, four large 1400 pf capacitors were connected in parallel and heated at 150° C. A high DC voltage of 160 volts was applied and the leakage current under these conditions was $8 \times 10^4$ M ohms (or $8 \times 10^{10}$ ohms). Measurements were also made at other temperatures so as to extrapolate to the room temperature (25° C.) value which became $1.5 \times 10^7$ M ohms (that could not be measured directly). The corresponding characteristic activation energy of this dielectric material was found to be 0.5 ev.

The possibility that magnesium zinc titanate may be nonreducible as is magnesium dititanate is suggested by the above mentioned U.S. Pat. No. 4,308,570. If magnesium zinc titanate were to be nonreducible it may make it possible to incorporate copper or other low cost base metal electrodes.

Wafer capacitors of 93.4 ($Mg_{\frac{4}{5}}Zn_{\frac{1}{5}}TiO_3$) 6.6 ($CaTiO_3$) and $MgO:B_2O_3$ were fired to maturity in a reducing atmosphere of $10^{-9}$ atmospheres of oxygen at 1065° C. for 2 hours. The bodies were semiconductive. Their color was a blue-gray rather than the usual cream color exhibited after an air firing. A silver ink was applied to the body ends and fired in air at 800° C. to form silver terminations. This air firing caused substantial reoxidation and return of the cream coloration. However, the Q of these capacitors was very low and they are not usable.

Even though magnesium zinc titanate compositions in capacitors of the present invention may not be fired in a reducing atmosphere, they may include low temperature 70Ag30Pd electrodes and be fired at 1100° C. using very little flux; and they advantagously exhibit very high Q values.

What is claimed is:

1. A monolithic ceramic capacitor having a Q of at least 5000 at 1 MHz comprising a dense mature ceramic body and at least one sheet electrode buried in said body, said at least one electrode extending to one body face, said body having been co-fired with said buried electrode; said body being comprised of from 92-98 weight percent of a high firing ceramic composition and from 8-2 weight percent of a low firing borate flux, said high firing ceramic composition consisting essentially of 90 to 95 weight percent of a magnesium zinc titanate and 10 to 5 weight percent calcium titanate.

2. The monolithic ceramic capacitor of claim 1 wherein said low firing borate flux amounts to from 5-2 weight percent.

3. The monolithic ceramic capacitor of claim 1 wherein said magnesium zinc titanate may have the molar formula $$Mg_xZn_yTiO_3$$

and wherein x ranges from 0.5 to 0.85 and wherein y ranges from 0.2 to 0.4.

4. The monolithic ceramic capacitor of claim 1 wherein said magnesium zinc titanate is $Mg_{\frac{2}{3}}Zn_{\frac{1}{3}}TiO_3$ and said $CaTiO_3$ contributes about 6.8% of the weight of said high firing ceramic.

5. The monolithic ceramic capacitor of claim 1 wherein said borate flux is selected from $5Cd:2SiO_2$, $CdO:2ZnO:B_2O_3$, $0.37ZnO:0.63B_2O_3$, $3MgO:B_2O_3$ and $2MgO:ZnO:3B_2O_3$.

6. The monolithic ceramic capacitor of claim 1 wherein the total amount of $B_2O_3$ in said body is from 1 to 3.5 mole percent of the number of titanium atoms.

7. The monolithic ceramic capacitor of claim 1 wherein the boron in said flux is at least twice the amount of silicon.

8. The monolithic ceramic capacitor of claim 1 wherein said buried electrode has a solidus temperature of about 1150° C.

* * * * *